United States Patent
Abrams et al.

(10) Patent No.: US 7,827,070 B1
(45) Date of Patent: Nov. 2, 2010

(54) SYSTEM AND METHOD FOR ASSISTING LIBRARIES AND VENDORS WITH SELECTION AND ACQUISITION OF MATERIALS

(75) Inventors: Joel Abrams, Powell, OH (US);
Jonathan Baker, Orient, OH (US);
Jonathan Fausey, Dublin, OH (US);
Rick Padro, Galena, OH (US); Robert Pearson, Upper Arlington, OH (US);
James Rayl, Columbus, OH (US);
David Whitehair, Columbus, OH (US)

(73) Assignee: OCLC Online Computer Library Center, Inc., Dublin, OH (US)

( * ) Notice: Subject to any disclaimer, the term of this patent is extended or adjusted under 35 U.S.C. 154(b) by 60 days.

(21) Appl. No.: 11/777,352

(22) Filed: Jul. 13, 2007

(51) Int. Cl.
  *G06Q 30/00* (2006.01)
  *G06F 17/30* (2006.01)
(52) U.S. Cl. .......................... 705/26; 705/27
(58) Field of Classification Search ............. 705/26, 705/27
  See application file for complete search history.

(56) References Cited

U.S. PATENT DOCUMENTS

| | | | | |
|---|---|---|---|---|
| 6,836,762 | B2 * | 12/2004 | Speicher | 705/14.73 |
| 7,072,857 | B1 * | 7/2006 | Calonge | 705/26 |
| 2002/0087646 | A1 * | 7/2002 | Hickey et al. | 709/206 |
| 2005/0004837 | A1 * | 1/2005 | Sweeney et al. | 705/14 |

OTHER PUBLICATIONS

WorldCat Selection http://web.archive.org/web/20060601185831/http://www.oclc.org/selection/default.htm.*
OCLC Selection http://web.archive.org/web/20010803213331/http://www.oclc.org/oclc/menu/selection.htm.*
Wick's Powerpoint, Jun. 2005 http://ecommons.library.cornell.edu/handle/1813/1484?mode=full&submit_simple=Show+full+item+record.*
Blackwell Collection Manager, Mar. 2006 http://web.archive.org/web/20060313134416/www.blackwell.com/librarian_resources/PDF_library/.*
New WorldCat Selection service to streamline selection process, OCLC Online Computer Library Center, Inc. Press Release, 2 pages, May 18, 2006, http://www.oclc.org/news/releases/200619.htm.
WorldCat Selection service helps streamline selection, ordering, OCLC Online Computer Library Center, Inc. Press Release, 2 pages, Dec. 14, 2006, http://digitalarchive.oclc.org/da/ViewObjectMain.jsp;jessionid=84ae0c5f8240c95378c8b....

(Continued)

*Primary Examiner*—Yogesh C Garg
*Assistant Examiner*—Matthew Zimmerman
(74) *Attorney, Agent, or Firm*—Standley Law Group LLP

(57) ABSTRACT

An automated system for assisting libraries and vendors with selection and acquisition of materials. Communications between vendors and libraries are accomplished through a networked computer library service. Material vendors send notification items to the computer library service for distribution to selectors at member libraries. The computer library service loads the vendor notification items for each library into a selection application. Librarians involved in materials selection for their libraries access the selection application to view notification records comprising notification items for their collection areas. Selectors take actions on notification records such as selecting, rejecting, forwarding, or deferring them. Library acquisitions staff export selected notification records, load them into each library's integrated library system, and complete the order electronically from the integrated library system. The library's holding symbol is automatically set on a corresponding computer library service bibliographic database record for the item to note addition of the item to library's holdings.

19 Claims, 11 Drawing Sheets

OTHER PUBLICATIONS

Coutts First to Partner With OCLC WorldCat in North America, Coutts Serving the World of Learning Press Release, one page, Apr. 19, 2007, http://www.couttsinfo.com/About/news/news_OCLC.htm.

OCLC WorldCat Selection Guides, Selector Activities, 24 pages, lasted updated: Mar. 29, 2007.

Whitehair, David and Buser, Robin, Partnering with OCLC for Cataloging and Selection, PowerPoint Presentation at the ALA Midwinter Conference, Jan. 20, 2007.

* cited by examiner

FIG-1

| | | Record | 1 | | Forward To | ▽ | Inbox (34) | | | | |
|---|---|---|---|---|---|---|---|---|---|---|---|
| | | | | | | | Deferred Reason | | ▽ | Action | ▽ |
| | | Added | Source | Held All | Author | | Title | Date | Call Number | Select | Fund |
| | | | | | | | | | | Reject | |
| | | | | | | | | | | Defer | |
| | | | | | | | | | | Forward | |
| 1 | ☐ | 20070110 | Harrassowitz | 15 | Chopin, Frederi... | | Second grand concert/ | 2005 | ML96.5.C57 | | |
| 2 | ☐ | 20070110 | Harrassowitz | 3 | Lessing, Gotthold... | | Samtliche Werke. | 1882 | PT2396.A1 | | |
| 3 | ☐ | 20070110 | Harrassowitz | 2 | Hader, Widmar, 1941– | | Zwolf makkaronische Lieder... | 2006 | | | |
| 4 | ☑ | 20070110 | Harrassowitz | 2 | | | Die Papst-Benedikt-Orgel in... | 2006 | | | |
| 5 | ☑ | 20070110 | Harrassowitz | 2 | | | Musik-Frauen-Gender:B... | 2006 | | | |
| 6 | ☐ | 20070110 | Casalini Libri | 1 | Vacchi, Fabio, 1949– | | Noc:per canto e pianofor | 2006 | | | |
| 7 | ☑ | 20070110 | Casalini Libri | 32 | Tosti, F. Paolo(... | | Romanze su testi italiani e... | 2002 | M1620.T716 1990 vol.8 | | |
| 8 | ☐ | 20070110 | Casalini Libri | 9 | Angelelli, Claudia | | Terni-Interamna Nahars:... | 2006 | DG975.T44T4685 2006 | | |
| 9 | ☐ | 20070110 | Casalini Libri | 15 | Fuchs, Barbara | | Bressanone/ | 2004 | DG975.B83B74 2004 | | |
| 10 | ☑ | 20070110 | Casalini Libri | 2 | | | Vivere il Medioevo:Parma... | 2006 | | | |
| 11 | ☐ | 20070110 | Casalini Libri | 2 | | | Les cites de l'Italie tard... | 2006 | | | |
| 12 | ☐ | 20070110 | Casalini Libri | 1 | Mercadante, Saver... | | Tantum ergo:per tenore so... | 2006 | | | |
| 13 | ☐ | 20070110 | Casalini Libri | 1 | Tagliaferri, Albe... | | Le strade del mistero di Ro... | 2005 | | | |
| 14 | ☐ | 20070110 | Casalini Libri | 1 | Baioni, Massimo. | | La storia di Fusignano/ | 2006 | | | |
| 15 | ☐ | 20070110 | Casalini Libri | 1 | Recupero, Antonin... | | Le stelle sono motre:scri... | 2006 | | | |
| 16 | ☑ | 20070110 | Casalini Libri | 1 | Vidotto, Vittorio... | | Roma contemporanea/ | 2006 | | | |
| 17 | ☐ | 20070110 | Casalini Libri | 1 | Zarri, Gabriella,... | | La religione di Lucrezia Bo... | 2006 | | | |
| 18 | ☑ | 20070110 | Casalini Libri | 1 | Salierno, Vito, 1... | | Le relazioni postali dell'I... | 2006 | | | |
| 19 | ☐ | 20070110 | Casalini Libri | 1 | Pagli, Paolo | | La rana di Basho: un haik... | 2006 | | | |
| 20 | ☑ | 20070110 | Casalini Libri | 1 | Bassignana, Pier... | | Quintino Sella: tecnico,p... | 2006 | | | |
| 21 | ☑ | 20070110 | Casalini Libri | 1 | Sunseri, Nino, 1954– | | Palermitani/ | 2006 | | | |
| 22 | ☐ | 20070110 | Casalini Libri | 1 | Dosi, Antonietta | | Otium: il tempo libero dei... | 2006 | | | |

| Selector | Acquisitions | Administrator | Preferences | Logoff |

Inbox (34) | Selected (2) | Forwarded to Me (2) | Deferred (4) | Exported (5)

Inbox Record 3 of 34     Previous | Next | Back to List

130 — No holdings in OCL-2 other holdings

Price [21.30]     Fund [Music ▽]     Deferral [      ▽]
Quantity [1]     Location [Music ▽]     Forward To [      ▽]

Select
Reject
Defer
Forward
Save
Cancel

132 — Zwolf makkaronische Lieder aus Bohmen, Mahren und Sudetenschlesien: fur gemischten Chor (SATB) a capella, 1996/ Widmar Hader; herausgegeben von Wolfram Hader.
Authors Hader, Widmar, 1941–
Material Type Score
Language Czech
Publisher and Date Frankfurt:Laurentius-Musikverlag, 2006
Physical Description 1 score (32p.) 1 facsim; 30 cm.
Notes German (Bohemian dialect) and Czech words, also printed separately as text with German translation. | Preface and biographical notes in German.
OCLC Number 76879252

Vendor Information

134 — HARRASSOWITZ
Vendor Control Number: har065022612
Vendor Price: USD21.3
Vendor Customer ID: D-FINE-FS
Vendor Keyword Data: H94

| Selector | Acquisitions | Administrator | Preferences | Logoff |

Selected Items | Download Export Files | History

Acquisitions Load History

| Added | Source | Records |
|---|---|---|
| 01/10/2007, 12:00 | Harrassowitz | 1409 |
| 01/10/2007, 12:00 | Harrassowitz | 696 |
| 01/10/2007, 12:00 | Casalini Libri | 756 |

150

| Vendor Name | Vendor Customer Id(s) |
|---|---|
| Casalini Libri | STA-DDD |
| Harrassowitz | D-FINE-FS, STA-DDD |

FROM FIG-5A

160

| Export Field | MARC Field | Subfield | Export Field | MARC Field | Subfield |
|---|---|---|---|---|---|
| Vendor Name | 980 | v | Quantity | 980 | g |
| Vendor Control Number | 980 | n | Fund | 980 | h |
| Vendor Customer ID | 910 | d | Location | 952 | b |
| Note From Vendor | 980 | m | User Field 1 | 981 | m |
| Selector | | | User Field 2 | | |
| Price | 981 | i | User Field 3 | | |

164

| Call Number on Lists | | Delete Notification Items | | |
|---|---|---|---|---|
| First Choice | 050 ▽ | Inbox | 180 | Days |
| Second Choice | 090 ▽ | Forwarded | 180 | Days |
| Third Choice | ▽ | Deferred | 180 | Days |
| Fourth Choice | ▽ | Rejected | 14 | Days |
| Fifth Choice | ▽ | Exported | 14 | Days |
| Sixth Choice | ▽ | | | |

166     168

| Vendor Name | Vendor Customer ID(s) |
|---|---|
| Casalini | CA123, CA123A, CA123B, CA123C |
| Harrassowitz | STA-MAIN, STA-LAW |

170

[ Save ]  [ Cancel ]

FIG-5B

Institution Funds List

Vendors | Selector | Acquisitions | Administrator | Preferences | Logoff
My Institution | Users | Funds | Locations | Collection Areas | Distribution OCL
Online Computer Library Center
Updated 2004-12-01 14:00

| Action | Fund Code | Fund Description |
|---|---|---|
| | | |
| Delete | FISCAL06 | Fiscal Year 2006 |
| Delete | LAW | Cavanaugh Law Library |
| Delete | MEDICAL | University Hospital Library |

[Save]  [Cancel]

Collection Areas

| Vendors | Selector | My Institution | Acquisitions | Users | Administrator | Funds | Locations | Preferences | Collection Areas | Logoff | Distribution |

OCL
Online Computer Library Center
Updated 2004-12-01 14:00

190

Collection Area Definitions

| Action | Collection Area | Selectors | | | |
|---|---|---|---|---|---|
| View | BusinGrad | Joanne S ▷ | ▷ | Professor Pearson ▷ | ▷ | David W ▷ | ▷ |
| View | Philosophy | ▷ | ▷ | ▷ | ▷ |
| View | Religion | ▷ | ▷ | ▷ | ▷ |

Save    Cancel

FIG-7

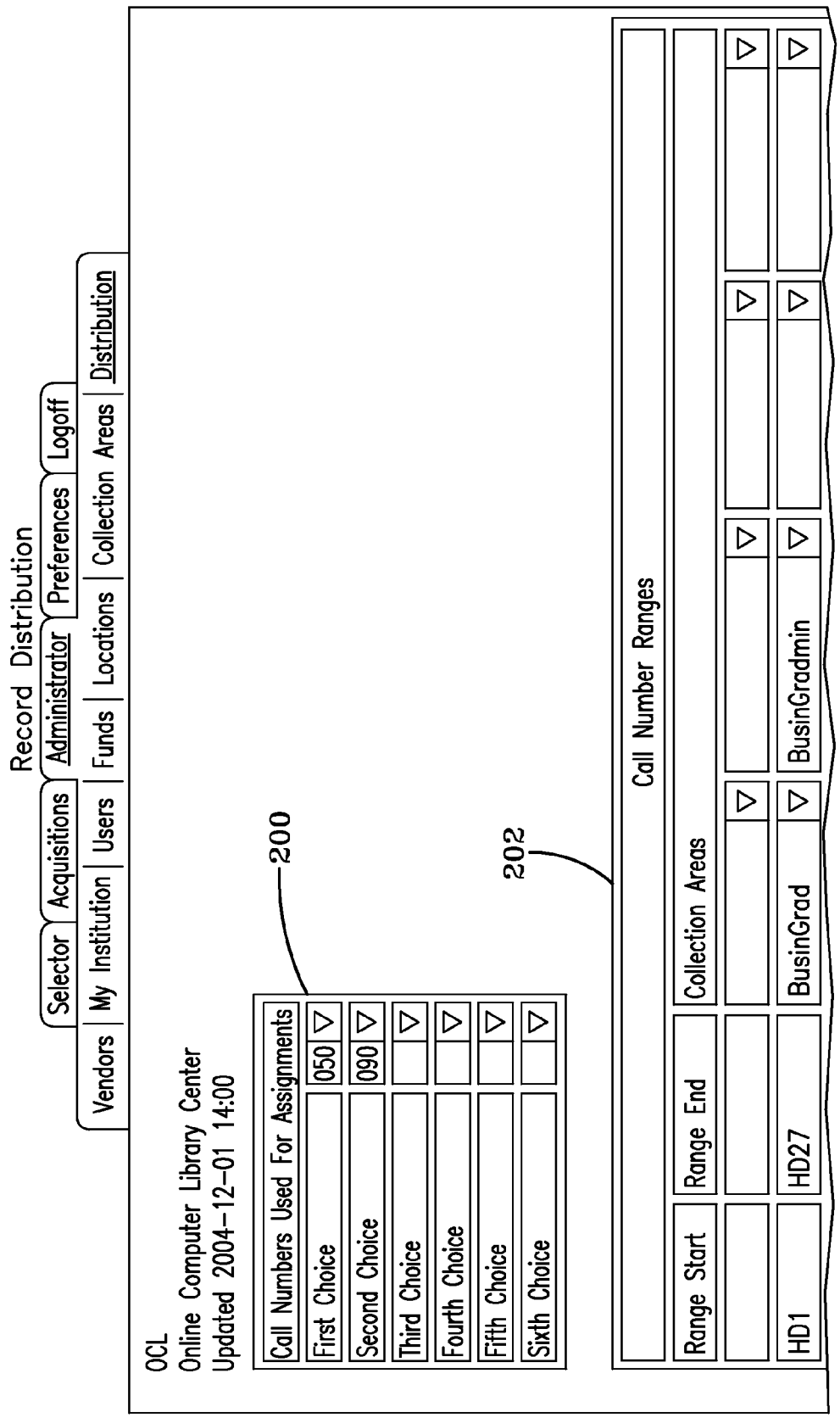

FROM FIG-8A

| | | | | | |
|---|---|---|---|---|---|
| HD28 | HD30 | BusinGrad ▷ | MannBus ▷ | BusinGradmin ▷ | ▷ |
| HD31 | HD31 | BusinGrad ▷ | MannBus ▷ | BusinGradmin ▷ | Labor ▷ |
| HD32 | HD58.6 | BusinGrad ▷ | MannBus ▷ | BusinGradmin ▷ | ▷ |
| HD58.7 | HD59 | BusinGrad ▷ | MannBus ▷ | BusinGradmin ▷ | Labor ▷ |

— 202

Keywords or Phrases

| Keyword or Phrase | Tag(s) | | | Subfield(s) | Collection Areas | | |
|---|---|---|---|---|---|---|---|
| | | | | | | ▷ | |
| ECONOMIST | 260 | | | | BusinGrad ▷ | ▷ | |
| MACRO-ECONOMIC | 000-999 | | | | BusinGrad ▷ | ▷ | |
| MACROECONOMIC | 000-999 | | | | BusinGrad ▷ | ▷ | |

[ Save ]  [ Cancel ]

SYSTEM AND METHOD FOR ASSISTING LIBRARIES AND VENDORS WITH SELECTION AND ACQUISITION OF MATERIALS

CROSS-REFERENCES TO RELATED APPLICATIONS

None.

FIELD OF THE INVENTION

The present invention relates generally to software tools for selecting and acquiring materials for a library. In particular, the present invention is a Web-based tool for providing to librarians notification items from vendors to assist them with selection and acquisition of materials for their libraries.

BACKGROUND OF THE INVENTION

Most libraries have one or more librarians that are "materials selection specialists" responsible for the review, evaluation, and selection of materials for their libraries. When selecting materials, librarians may follow selection policies established by their libraries to be sure they select materials that are appropriate for their collections and that are likely to be of interest to their patrons. Librarians may look first for materials that have appropriate content based on subject matter and audience level and that are complementary to other holdings in the library's collection. In addition to considering content, librarians may further consider material formats (e.g., print, nonprint, electronic, multimedia) to meet the needs and learning styles of a diverse patron population. They may also track budget and funding information to be sure that the materials they select are within budgetary guidelines established by their institutions.

Materials selection for libraries is an important function that involves expertise in understanding the library's collection and needs. It also involves a number of clerical tasks. Librarians and acquisition staff review vendor offerings, accept and decline those offerings, and for those offers that are accepted, follow the acquisition from ordering to receiving, accounting, cataloging, labeling, and shelving the new materials. Failure to accurately carry out these clerical tasks can result in unintentional duplication of materials because one or more librarians is not aware of a selection made by another librarian, or it can result in gaps in the collection because one or more librarians believes incorrectly that another librarian ordered a particular item. Communication and sharing of accurate information at the different stages of the acquisition process, therefore, is important in helping libraries avoid such problems with materials selection.

A current vendor business practice of sending materials to libraries prior to approval complicates the selection and acquisition process. Some vendors allow libraries to participate in subscription or standing order plans that result in materials being sent automatically to the library with no option for reviewing or approving them prior to receipt or for returning them once they are received. The only way to stop receiving the materials is to cancel the subscription or standing order. Other vendors send materials automatically under an approval plan. Vendors complete mass mailings of the materials to numerous libraries for approval. A library is permitted to return the materials if they are not appropriate for its collection. These plans sometimes result in inefficiencies for both vendors and libraries. Vendors incur costs in sending materials to libraries that do not want them and in some cases, accepting returns of the materials and libraries incur costs in monitoring and canceling subscriptions and in some cases, returning materials that they do not want.

Cornell's Integrated Tool for Selection and Ordering at Cornell University Library ITSO CUL is a tool that was developed to improve vendor-library communications. It is a library materials selection Web-based tool that a selector accesses to perform selection tasks. It facilitates the process of reviewing vendor offerings and communicating information about selections between librarians responsible for materials selection. The ITSO CUL selection tool also has database and cataloging functionality so that records regarding ordered materials may be tracked. When the purchases are complete, information about the acquisitions may be cataloged in the libraries' collections databases.

Although the ITSO CUL selection tool allows selectors to review and approve materials before they are sent by a vendor, it is tailored for use with a particular integrated library system and therefore, cannot be used with another library's integrated library system without modifications and customizations. Even if the ITSO CUL selection tool could be modified easily for use with many other integrated library systems, only libraries would benefit from the widespread deployment of the tool. Vendors would still need to tailor their communications for compatibility with each library's selection tool and integrated library system. A vendor that would like to communicate information about a new offering may be required to tailor a different message for distribution to each library with which it would like to conduct business so that the message can be received at the library's selection tool and integrated library system. The process of tailoring communications for each library selection tool is an inefficient and error prone process.

The process of tailoring communications for different selection tools is also inefficient for libraries. Librarians that would like to receive materials from many different vendors may be required to work independently with each vendor of interest to communicate information about its selection tool and integrated library system so that it can resolve technical difficulties in communicating with the vendor. The time and resources devoted to such technical issues adds to a library's overhead costs and reduces the ability of librarians or other personnel to concentrate on materials selection and acquisition and on other tasks. Therefore, there is a need for a materials selection and acquisition tool that facilitates communications between multiple vendors and libraries and that reduces the need to modify and format communications for different selection tools and related integrated library systems in use by libraries.

SUMMARY OF THE INVENTION

The present invention is an automated system for assisting libraries and vendors with selection and acquisition of materials. In an example embodiment of the present invention, the system comprises a Web-based selection application for use by librarians involved in the materials selection and acquisition process for their libraries. Communications between vendors and libraries are accomplished through a networked computer library service such as the Online Computer Library Center (OCLC). Material vendors send notification items to the computer library service for distribution to one or more member libraries that belong to the computer library service. The computer library service loads the vendor notification items for each library into a selection application at the computer library service. Selectors at each library log into the selection application to view notification records comprising vendor notification items for their collection areas and view notification records from multiple vendors in the selection application. Selectors take actions on notification records such as selecting, rejecting, forwarding, or deferring them. Library acquisitions staff export all selected records from all selectors and all vendors, load them into each library's integrated library system, and complete the order electronically from the integrated library system. In addition, the library's holding symbol is automatically set on the corresponding computer library service bibliographic database record for the item so that addition of the item to the library's holdings is noted quickly and easily.

The selection system of the present invention helps libraries streamline the selection and ordering process for new materials, and it delivers the corresponding computer library service bibliographic database records so the new materials are added to the library's collection. Staff time is saved because the need to rekey or import data from multiple sources is eliminated. Unintentional duplication of material acquisition is reduced because all selectors at each library see all of the selection decisions. The ability to see the selection decisions may also help libraries to expand their holdings in one or more areas of expertise. Selectors may establish priorities for ordering additional items based on their review of selection decisions made by other selectors.

BRIEF DESCRIPTION OF THE DRAWINGS

FIG. 1 is an inbox screen shot for a selection application according to an example embodiment of the present invention;

FIGS. 2A and 2B are a notification record screen shot for a selection application according to an example embodiment of the present invention;

FIG. 4 is an acquisitions load history screen shot for an example embodiment of the present invention;

FIGS. 5A and 5B are an institution detail screen shot for a selection system according to an example embodiment of the present invention;

FIG. 6 is an institution funds list screen shot for a selection system according to an example embodiment of the present invention;

FIG. 7 is a collections area screen shot for a selection system according to an example embodiment of the present invention; and FIGS. 8A and 8B are a record distribution screen shot for a selection system according to an example embodiment of the present invention.

DETAILED DESCRIPTION OF THE INVENTION

Figure 2B:
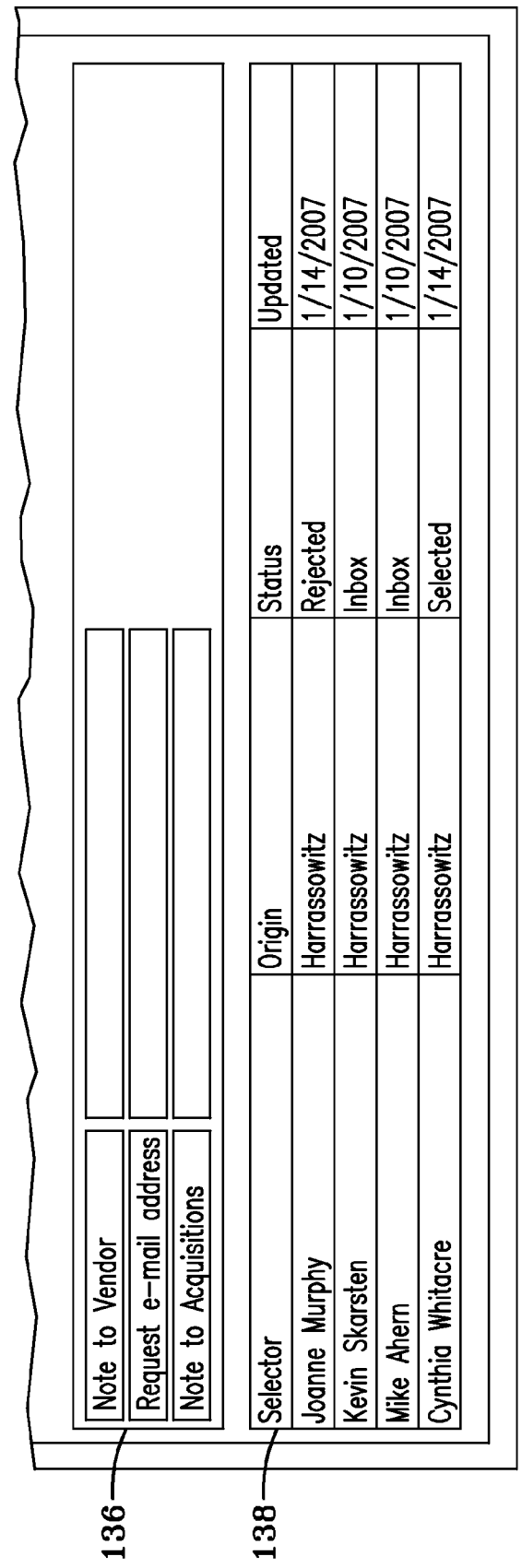

The selection system of the present invention facilitates communications between vendors and libraries using a centralized computer library service. There are three types of users of the selection system and corresponding authorization levels: Selector, Acquisitions, and Administrator. Levels, and their respective capabilities, correspond to typical divisions of responsibility and tasks within an institution as shown in the following table:

TABLE 1

| Authorization Level | Capabilities |
|---|---|
| Selector | Selector tab:<br>1. View notification records<br>2. Modify notification records to specify fund, location, price, and ISBN order (Selector can also enter notes; other record content is read-only.)<br>3. Take actions on notification records to select titles, reject them, defer a decision (with optional reason), or forward a record to another selector |
| Acquisitions | Acquisitions tab:<br>1. View a summary of all notification records currently selected by all selectors at institution<br>2. Export all selected notification records<br>3. Download files of exported records and load the records into the integrated library system<br>4. View a history of notification records loaded into selection application for institution |
| Administrator | Administrator tab:<br>1. Establish institution settings: Examples include:<br>a. User names and their aliases<br>b. Fund codes and descriptions<br>c. Location codes and descriptions<br>d. User-specified note fields: labels, possible values, mapping to exported records<br>2. Enable system to identify subject areas of titles (by call number range or keywords) and route notifications to assigned selectors |

The following table outlines routine processing of notification records using the selection application.

TABLE 2

| Done by | Action | Results/Notes |
| --- | --- | --- |
| Materials Vendor | Send to computer library service notifications for new publications, based on a profile defined by the library. Identify recipients: institutions and (optionally) selectors. | |
| Selection Application | Merge vendor notifications with matching notification records in central library service bibliographic database. | |
| Central Computer Library Service Selection System | Route notification records to institutions and selectors. | Notification records arrive in selectors' Inboxes. Notification records go to a selector identified in vendor data or if vendor does not designate a selector, records go to selector responsible for the subject area. System determines subject area by call number, by keywords found in the record, and by values for certain elements in the record's fixed field. Administrator specifies call number ranges, keywords, and element values that identify subjects. Unmatched notification records go to the default selector. |
| Selector | Review notification records in Inbox and Forwarded to Me folders. | Selector scans lists, views full notification records. |
| Selector | Forward notification records to other selectors. Choose a selector name and take the Forward action. | Notification records move from Inbox to the recipient's Forwarded to Me folder. |
| Selector | Reject notification records for materials already selected by another, previously ordered, currently held, or unsuitable based on collection policies. Take the Reject action. | Notification records move from Inbox to Rejected folder. |
| Selector | Defer a decision on notification records. Choose a reason for the deferral. Then take the Defer action. | Notification records move from Inbox to Deferred folder. |
| Selector | For titles to be selected, make desired changes to the notification records. View the full notification record and then change values for fund, location, price, or ISBN order. Enter notes or change existing notes if applicable. Then take the Select action. | Other notification record content is read-only. Notification records move from Inbox to Selected folder. |
| Acquisitions Staff | Export notification records for selected materials. Review the Summary screen for notification records currently selected by all selectors at the institution. Then select Export Selected Records. | Exported MARC records are stored in a file on computer library service server. On the Acquisitions tab, new files of exported records are listed on the Download Exported Records screen. On the Selector tab, notification records move from selectors' Selected folders to their Exported folders. |
| Acquisitions Staff | Download files of exported records. At the Download Exported Records screen, choose the file(s) to download. Then select Download. Save the file in the location used for loading records into the integrated library system. | File name is defined by the selection administrator as part of settings for the institution. |
| Acquisitions Staff | Load notification records exported from Selection into the integrated library system. | If the integrated library system imports records automatically from a designated location, this step occurs without staff intervention. |
| Acquisitions Staff | Review and track processing of notification records from vendors that have been loaded into selection application for the library. | The history screen on the Acquisitions tab lists records loaded into the selection application for the library during the past 30 days. |

The materials selection and acquisition process begins when vendors send notification items related to items that may be of interest to one or more libraries that use the computer library service. Vendors use library profile information to decide which libraries that belong to the centralized computer library service should receive electronic notifications for items offered. The electronic notifications contain bibliographic information that can be loaded into a comprehensive computer library service bibliographic database comprising records from the bibliographic and ownership information of the member libraries. The electronic notifications also contain vendor data. Member library selectors then access the selection application to review notification records for the notification items from the different vendors and act on them.

Referring to FIG. 1, an inbox screen shot for a selection application according to an example embodiment of the present invention is shown. The inbox comprises notification records for notification items from a plurality of vendors and organizes them according to a plurality of categories as shown in Table 3. Details for the different categories are as follows:

A selector may perform actions on the notification records by selecting options from drop down menus. The selector may specify another selector within the library to receive an item by selecting an identifier from a Forward To list 112. The selector may specify a reason for deferring a decision by selecting a reason from a Deferred Reason list 114. An action of select, reject, defer, or forward may be selected from an action list 116. A selector may perform actions on single items or groups of items. Multiple items may be flagged 118 so that a selected action is applied to all flagged items. Some libraries may require selectors to specify fund or location information prior to acting on a notification record. If this requirement is in effect, a notification record cannot be selected without specifying a fund and/or location.

The selector may further customize the list by hiding columns (e.g., by selecting a show/hide toggle on a column), changing the record sorting order (e.g., by selecting a column heading to re-sort a list), or selecting a data values option to view all data or view truncated data.

TABLE 3

| Tab | Description |
| --- | --- |
| Inbox 102 | Notification records arrive in the Inbox when the vendor notifies a selector through the computer library service that a title is available. From the Inbox, the selector can select a notification record, reject it, defer a decision on it, or forward it to another selector. |
| Forwarded to Me 106 | Lists notification records forwarded to selector by another selector at the library. As in the Inbox, available actions are select, reject, defer, and forward. |
| Selected Folder 102 | Notification records that the selector acts on move from the Inbox to another folder based on the action taken: Selected, Rejected, or Deferred. The selector can access selected notification records and take further action on them until they are exported by acquisitions staff (records in the Exported folder are read-only). Rejected or Deferred records remain accessible until automatically deleted from the system. |
| Rejected Folder (Not Shown) | |
| Deferred Folder 108 | |
| Exported Folder 110 | Selected notification records to be processed by acquisitions staff. |
| Forwarded records (Not Shown) | Notification records that selector forwards to another selector (i.e., moves to another's Forwarded to Me folder). Once a notification record is forwarded, it can no longer be accessed. |

Column details 120 are as follows:

TABLE 4

| Column | Description |
| --- | --- |
| Added | Date added |
| Source | Vendor Name |
| Held | In institution's holdings in comprehensive bibliographic database |
| All | Total Holdings |
| Author | Personal or corporate/conference author |
| Title | Title of work from record |
| Publisher | Publisher of work |
| Date | Date (year of publication) |
| Call Number | Classification number |
| Fund | Fund description from record |
| Deferred Reason 114 | Indicates why selector deferred action |
| Forwarded To 112 | Name of person to whom record should be forwarded |

Additional details regarding the inbox and related folders are as follows:

TABLE 5

| About | Notes |
|---|---|
| Maximum records | Each folder can display up to 1000 entries for notification records. Once 1000 entries are displayed, additional notification records are listed after action is taken on current records. Taking an action moves the notification records to other folders. |
| Record Retention | Records remain in a folder based on an administrator set limit (or system default). Rejected notification records are deleted automatically after 14 days. For other folders, a system default of 365 days applies. |
| Refreshing Record Lists | The list of notification records is refreshed when a selector: Takes an action (Select, Reject, Defer, Forward) on one or more notification records from the list. Takes an action (Select, Reject, Defer, Forward) on a single notification record while viewing the full record. Customizes the list (e.g., re-sort the items, turns data truncation on or off, adds or removes columns). Switches to another folder or returns to the current folder from viewing records if the selector selects the folder name on the navigation bar (or uses an assigned keystroke). One entry is updated, but the list is not refreshed when the selector edits a notification record, saves the record, and then selects Back to List (or presses an assigned keystroke) to return to the list. The list is not refreshed when the selector: Views a notification record and selects Back to List (or presses an assigned keystroke) to return to the list. Views several notification records without returning to the list. Edits an open notification record, cancel changes, and then selects Back to List (or presses an assigned keystroke) to return to the list. Results of refreshing the list: Flags (check marks) are cleared. Changes to list display (columns, sorting, etc.) take effect. Notification records move from or appear in the current folder as the result of actions. |

Referring to FIGS. 2A and 2B, a notification record screen shot for a selection application according to an example embodiment of the present invention is shown. Each notification record combines the following information about one vendor notification item:

1. Institution-specific information 130 (FIG. 2A), including the fund, location, and other data (e.g., price) based on customization completed by a system administrator and/or by the selector;
2. Bibliographic information 132 (FIG. 2A) (author, title, publisher, etc.) from the library service bibliographic database record;
3. Vendor-specific information 134 (FIG. 2A) for the vendor offering the item;
4. Custom note fields 136 (FIG. 2B) defined by the institution administrator; and
5. Selectors who received copies of the record 138 (FIG. 2B) and any actions they have taken on the record.

A selector may also edit certain information in notification records and process them. Editable content in a notification record in the Inbox, Selected, Rejected, or Deferred folder may be edited as follows:

TABLE 6

| Item | Procedure | Source/Notes |
|---|---|---|
| Price | To change: Edit the displayed price or type the new price in the box. | Source: Vendor-supplied price, if any. If the vendor data does not include a price, the Price box is empty. |
| Quantity | To change: Type the number of copies in the box. | System supplied default: 1. |
| Fund | To change: From the Fund list, select a fund. | Source: Vendor-supplied fund, if among funds defined by the administrator. Fund box may be empty. |
| Location | To change: From the Location list, select a location, | Source: Vendor-supplied location, if among locations defined by the administrator. Location box may be empty. |
| Deferral | To change: From the Deferred Reason list, select a reason. | Source: List of possible reasons defined in Selector Preferences. Deferral Reason box may be empty. |
| Forward To | To change: From Forward To list, select name of a selector to receive the record. | Source: Forward To box lists other selectors at institution. Computer library service supplies a list of authorized selection users for institution. |

TABLE 6-continued

| Item | Procedure | Source/Notes |
| --- | --- | --- |
| ISBN to Export First | Default: The first ISBN in the bibliographic database record appears first in the exported record. To change: From the list, select the ISBN to place first in the exported record. | Source: Bibliographic database record for the item. If the database record contains multiple ISBNs, all ISBNs appear in the ISBN to Export First list. |
| Note fields | To change: In each field, edit the default note or type a new note. | Source: Administrator settings for notes to display in notification records. Selectors can modify or replace text in each field (up to 60 characters). |

A selector may specify preferences such as sort order for the notification record list order, deferred reasons to be included in the deferred reasons list, fund options based on a list of available funds entered by an administrator, or location options based on a list of available locations entered by an administrator. A selector may also define criteria to automatically exclude items from the inbox that matched the administrator profile.

Figure 3:
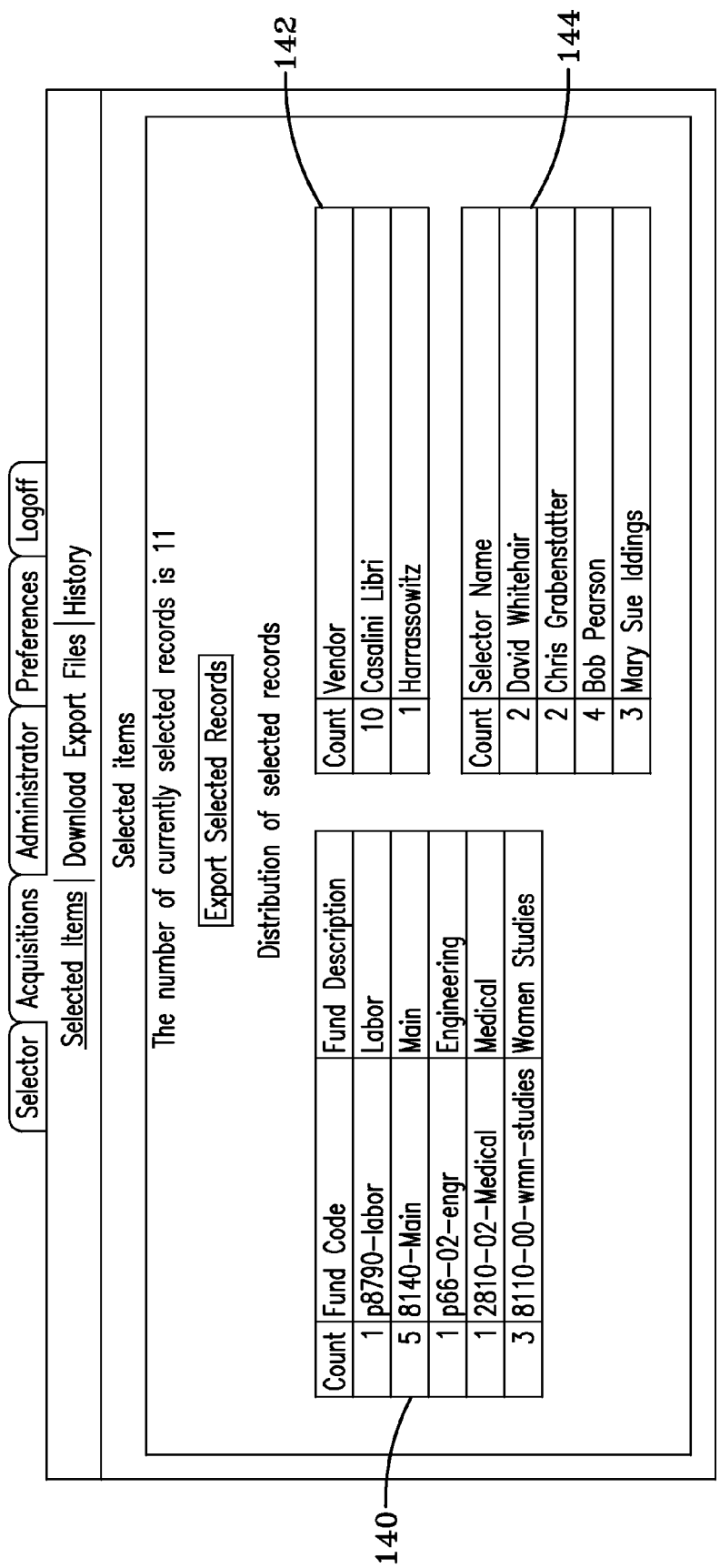
FIG. 3 is a selected items screen shot for a selection application according to an example embodiment of the present invention.

Referring to FIG. 3, a selected items screen shot for a selection application according to an example embodiment of the present invention is shown. The selected items screen shows an acquisitions staff person a summary of the notification records that have been selected by various selectors for export to the acquisitions staff. The summary shows a distribution of the items account to various criteria such as fund codes and descriptions 140, vendor 142, and selector 144. As items are added to the library's collection, the library's holding symbol is automatically set on the corresponding computer library service bibliographic', database record for the item so that addition of the item to library's collection is noted quickly and easily.

Referring to FIG. 4, an acquisitions load history screen shot for an example embodiment of the present invention is shown. The load history provides a summary of items 150 that have been sent from the vendor organized by add date and time. It also provides vendor information 152.

Figure 5A:
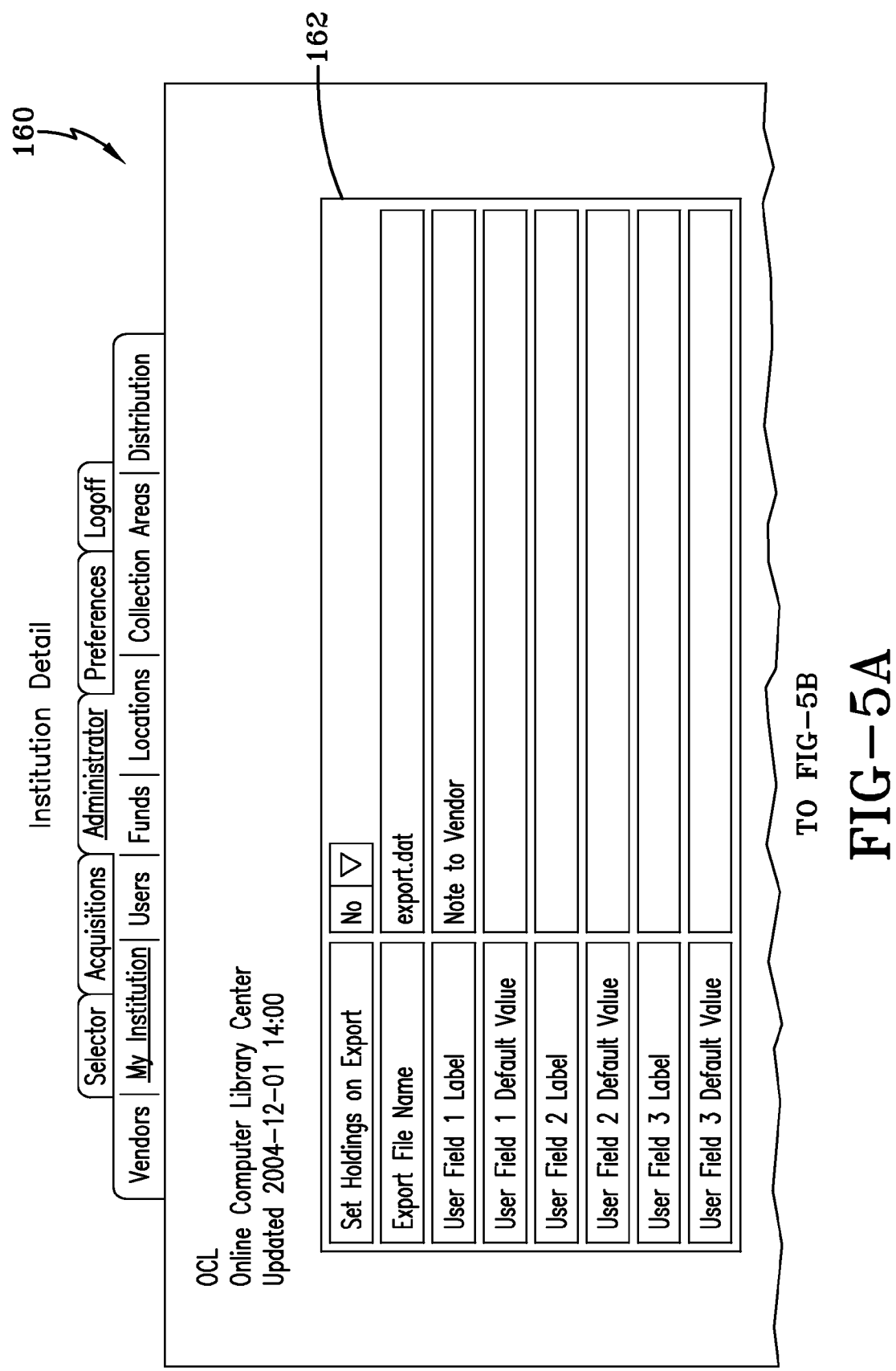

Referring to FIGS. 5A and 5B, an institution detail screen shot for a selection system according to an example embodiment of the present invention is shown. The institution detail screen 160 is used by an administrator and comprises a plurality of sections for entering data and defining information to be included in notification records for the library. User fields may be defined 162 as well as fields comprising vendor, selector, price quantity, fund, and location information 164. In addition, call number data 166 and time periods for maintaining notification records 168 may be defined. Finally, the screen may present associations of vendor names and customer identifiers 170.

Referring to FIG. 6, an institution funds list screen shot for a selection system according to an example embodiment of the present invention is shown. The institution funds list allows an administrator to define associations between fund codes and fund descriptions 180. The fund descriptions are used by selectors to specify funds to be used in purchasing selected items.

Referring to FIG. 7, a collections area screen shot for a selection system according to an example embodiment of the present invention is shown. The collections area screen allows an administrator to define collection areas for the institution and identify selectors responsible for review and selection of notification items in the related collection area 190.

Referring to FIGS. 8A and 8B, a record distribution screen shot for a selection system according to an example embodiment of the present invention is shown. The record distribution screen allows an administrator to specify call numbers used in selector assignments 200 (FIG. 8A), define call number ranges to be associated with various collection areas 202 (FIGS. 8A and 8B), and associate keywords/phrases or tags with selection collections 204 (FIG. 8B). The call number and keyword/phrase/tag data is used to route notification records to selectors. Notification items that contain data for matching with selector assignments may be routed to a default selector inbox.

In an example embodiment of the present invention, server based applications execute on Red Hat™ Linux. Librarians use Web browsers to access the Web based selection application using the HTTP protocol. For valid requests, the selection application returns HTTP responses containing HTML, Javascript®, and images. Applications are developed using a Component-Oriented Web-application framework using a combination of JavaServer® Faces plus Apache. Apache Trinidad and Tomahawk are also used. Application framework components for an example embodiment of the present invention include the following:

TABLE 7

| Framework Component | Description |
| --- | --- |
| Apache MyFaces - JavaServer Faces Implementation | JSF includes a basic set of UI components that are used whenever the Tomahawk or Trinidad component libraries do not provide an upgraded version (e.g. <f:facet>) or when a JSF component implements its attributes so as to provide cleaner html output (e.g. <f:verbatim>). |
| Apache Trinidad - JavaServer Faces Component Library | Trinidad components are used for user interface components. |
| Apache Tomahawk - JavaServer Faces Component Library | Tomahawk components may be used within the application wherever they provide a useful feature not supplied by Trinidad (e.g. <t:div> because it supports a forceld attribute) or when a |

TABLE 7-continued

| Framework Component | Description |
|---|---|
| | corresponding Tomahawk component is superior to a Trinidad counterpart (e.g. <t:dataTable> versus <af:table>). |
| Tiles - JavaServer Pages Templating Technology | Most of the pages have the same basic layout: a header, navigation items, and a footer. Tiles is a custom tag library that supports creation of a layout with placeholders for free-form content areas and to dynamically fill in the content areas (tiles) at runtime. Separating content areas from layout makes maintenance of both easier because changes to the layout are made in one place and content changes do not affect them. |
| Spring Inversion of Control (aka Dependency Injection) | The Spring framework is an open-source software distribution that includes an IoC framework that supports both setter and constructor injection. Spring IoC features offer support for programming practices like coding to interfaces and favoring composition over inheritance. Spring also has support for Aspect-Oriented Programming (AOP). AOP makes it easier to generate statistics, but aspects can be useful in many different ways including logging and tracing. Spring also provides convenience classes that simplify data access code by eliminating try/catch wrappers, generalizing Object-Relational Mapping (ORM) packages including the exceptions they generate, and generalizing transaction management so that it is easy to switch between different options. |
| Hibernate Object-Relational Mapping (ORM)/Persistence Software | Hibernate is an open source ORM tool that is used to persist data entered or edited in the application user interface to a database (an Oracle relational database in this case). Hibernate uses XML files to map values in tables in the database to properties in Java objects. The Java objects are displayed and modified by the application and can be persisted in the database easily using Hibernate.<br>The Hibernate Query Language (HQL) is higher-level and more generic than vendor-specific SQL implementations and Hibernate automatically translates HQL into target-specific SQL. HQL is used to develop database queries, inserts, and updates.<br>Hibernate also allows native JDBC commands containing target-specific SQL statements.<br>Hibernate employs a first and second level caching strategy that supports. Hibernate provides an abstraction between the application and the database with convenience methods that improve ease-of-development and reduce the impact of changes to back-end components. |
| Web Server and Servlet Container | The Apache HTTP Server (Web server) is used to front the application framework and the Apache Tomcat servlet container is used in the official reference implementation of the Java Servlet and JavaServer Pages technologies. Apache and Tomcat processes are deployed in pairs, each pair representing one instance of the application. Multiple instances of the application are replicated as needed behind a single logical domain name (farm address). |
| Session Routing | An active HTTP cookie insert feature is used to route requests back to their originating Apache/Tomcat process stack. The functionality may be provided by network routers at the computer library service. |

JSF provides a Model-View-Controller (MVC) software architecture. In the MVC architecture, the data or "business objects" that are manipulated by the application and its users are referred to as the model. For the present invention, the model includes objects such as notification items, folders, funds, institutions, users, bibliographic records, etc. Each such object is designed as a "plain old Java object" or POJO with no specific knowledge of how it is rendered or stored.

The view consists of HTML forms displayed to users by their Web browsers. JSF provides a six-phase request processing lifecycle (plus additional event processing plug-points between the phases) which is the controller that binds the view to the model and invokes the application's business logic. The rest of the detailed design is organized into view, model, and controller sections.

The primary views in the selection application user interface are described below. The explanation of how those views are brought about follows.

TABLE 8

| View | Description |
|---|---|
| Folder List | Tabular displays in which each row contains data from a notification item and most of the columns correspond to a property of the item such as its title, author, publisher, etc. Many of the columns are sortable, causing the entire |

TABLE 8-continued

| View | Description | |
|---|---|---|
| | table to be re-sorted based on the values in the sorted column. These views also include a column with links to the detailed view of each row's item and a column with a checkbox to flag the row for an action that applies to all flagged rows. | |
| | Inbox | Displays the list of items recently received by a selector from a vendor or other external source. |
| | Selected Items | Displays the list of items selected for purchase by a selector. |
| | Rejected Items | Displays the list of items rejected by a selector. |
| | Deferred Items | Displays the list of items deferred for future consideration by a selector. |
| | Forwarded (to me) Items | Displays the list of items forwarded to a selector by other selectors. |
| | Exported Items | Displays the list of formerly selected items that have been exported by acquisitions. |
| Notification Item Detail | Displays a combination of data from a notification item, bibliographic database, and the source/vendor to provide a selector with more information on which to make a decision. It also allows the selector to determine the price, fund, and any notes that should be attached to the notification record should it be purchased. | |
| Selector Preferences | Displays options such as institution-specific funds and location codes that a selector can choose to include in pull down menus that appear in the notification item detail view. | |
| Acquisitions Export Summary | Displays a summary of the selected items for an institution and allows the user to chose items to be exported to the local system for purchasing. | |
| Acquisitions Export History | Displays a limited history of exports by an institution. | |

View Delivery: The fundamental view technology in JSF is JavaServer Pages (JSP). Each view (page) or subview (part of a page) that appears in the application's user interface is based on JSP. Each JSP file may include a combination of HTML tags, Javascript, CSS styles, JSP tags, JSF UI component tags, and tags from other JSP or JSF custom tag libraries such as Shale, Tiles, Trinidad, and Tomahawk. Each view conforms to a predetermined layout. There is a master layout for every view in the selection application and several variant layouts that add different details to the master layout for different types of views.

View layouts are defined in two parts: a JSP file using the Tiles "insert" custom tag as a placeholder for inserting a chunk of content (tiles) at runtime; and a definition in an XML file using the Tiles DTD to define the layout's name, JSP file, and names for the tile placeholders it contains. Content tiles are also defined in two parts: a JSP file containing the desired content; and a Tiles XML definition that defines the tile's name and JSP file. The views to be rendered use a Tiles XML definition. Those definitions reference a layout and the content tiles to be inserted into the layout and have a unique name that identifies the view (a view id). Each view identifier corresponds to one page in the user interface. A view is assembled at runtime (during JSF's render response phase) by the Tiles servlet, which combines the layout JSP and content tiles JSPs and provides the result to the JSF render response phase to render. The layouts, tiles, and corresponding views for the Selection user interface are discussed in more detail below.

Wherever possible, events are handled by the relevant JSF UI components by setting their event-related attributes rather than with Javascript. Javascript onload event handler functions are used to accomplish some things like the desired row/column banding (alternating colors), as well as showing/hiding columns. Javascript onselect event handler functions are also used, to accomplish the "select all/unselect all" and dynamic "show/hide" of individual columns, for improving the visible element focus, and for applying access keys within IE. The necessary functions are all in a file named selection.js.

Master Layout: most views inherit from a single master layout that includes:

1. universal Javascript and CSS styles (references or inline);
2. a header banner containing logos and a help link;
3. universal components such as the message bundle, and the page component (which includes the navigation components, no content, and copyright footer component) and others;
4. a placeholder component for a context-specific Javascript file: <tiles:insert name="headScript" type="attribute" flush="false"/>; and
5. a placeholder component for context-specific page content: <tiles:insert name="content" type="attribute" flush="false"/>

The master layout consists of the file mainLayout.jsp and the Tiles definition named "bannerNavFooter.layout" in the file WEB-INF/tiles.xml. The file mainLayout.jsp contains the following elements:

TABLE 9

| File Component | Description |
|---|---|
| JSP response.header statements | To prevent browsers from caching pages. |
| HTML <html>, <head>, | Rather than "equivalent" JSF component tags such as Trinidad's <tr:html> |

TABLE 9-continued

| File Component | Description | |
|---|---|---|
| and <body> tags | and <tr:head> | |
| HTML head element: | Javascript variables and functions | For pages declared "inline" because some operations, such as load timing, are more accurate when the browser finds them as early as possible. |
| | References to common external style sheets and Javascript files | Those that are used by all views are declared first. These include the Trinidad skins style sheets (by way of Trinidad's styleSheet component) and Selection's highest level CSS and Javascript files (selection.css and selection.js). |
| | Tiles "insert" custom tag placeholder for inserting view-specific CSS and Javascript at runtime | Most views provide content for this tile. The naming convention is "headScript" plus some view-specific suffix. |
| HTML body element: | Page header | Including branding information. In development and QA environments, the header also includes a last-compiled timestamp for the page and a system type indicator, i.e. "Dev", "QA", or "Prod". |
| | Trinidad Form Component | Contains content area of the page (and pages that inherit from this layout). The form declaration uses a specific ID attribute and also contains an onsubmit handler. The onsubmit handler provides a client-side lockout mechanism. |
| | Trinidad Page Component | Manages other content within the page, including the navigation, message bundle, and title components, an outer table that provides a border with rounded corners for the data, and the footer. |
| | A reference to the selection.js onloadSetup( ) function in the onload (event handler) attribute of the body tag | OnloadSetup function calls the functions that apply to every view plus a function named onloadSetupCustom( ). Each view defines its own onloadSetupCustom( ) function within its headScript tile. If a custom function is not needed, the headScript tile omits it and selection.js provides a default stub. |
| | A default onunload handler and (for IE only) a default onbeforeunload handler. | Handle automatic logoff and timeout mechanisms. |

Styles in the Master Layout: The first external file included in all pages is the Trinidad skins style sheet via Trinidad's styleSheet component as described above. The main Selection style sheet (selection.css) is included later. It overrides selected Trinidad skins definitions and provides additional application-specific style definitions.

Folder List Views: While each folder list view has a unique view-id, it inherits from a folder list layout that extends the master layout by specifying the actual Javascript file to be inserted as the "headScript" tile in the layout (specified Javascript file provides functions needed to display and manage folders and specifying a tile to be inserted as the "content" tile in the layout). When fully assembled, the content tile includes everything necessary to display and manipulate the list of items in each folder. It has a data table component to display the list plus components to display the available actions, defer reasons, forward-to selectors, flagging checkboxes, and components that control what columns to show/hide.

View Navigation: As mentioned above, a key component included in the master layout is the Trinidad page component. The page component is the container for all view-specific content. It also supports several facets such as a header, footer, and a hierarchy of navigation components. The page component's nodeStamp facet can be given a template component to "stamp down" on each navigation element in the hierarchy. A Trinidad commandNavigationitem component is used in a hierarchy of navigation elements. The hierarchy of navigation elements is backed by a Trinidad ViewIdPropertyMenuModel bean. The bean maps each path to a leaf node in the hierarchy to a view-id. When a user navigates to a view, the page component's nodeStamp facet renders each navigation element on the path to the leaf node that matches the view-id and renders them as "active" (styling). Siblings of the active navigation elements are rendered as "inactive", and their children are not rendered.

Notification Items: A notification item contains information about a resource (such as a book) that a material vendor (or other source) sends to a selector so the selector can determine whether the resource should be acquired for his or her collection. Notification items include information such as the resource's title, author, publisher/date/location, classification (call numbers), etc., plus the source's name, price, item identifier, etc., and the receiving institution's and/or user's identifiers, locations, funds, etc. There are several context-specific representations of a notification item, each of which implements a common interface named SelectionItem. This interface includes public getters for the following properties, some of which also have public setters as shown in the following table:

TABLE 10

| Properties | Details |
| --- | --- |
| Resource Bibliographic Information | String title |
| | List alternateTitles |
| | List uniformTitles |
| | List authors |
| | MaterialTypeEnum materialType |
| | Audience audience |
| | String language |
| | List editions |
| | List publication Data |
| | List descriptions |
| | List series |
| | List subjects |
| | List lcCallNumbers |
| | List deweyCallNumbers |
| | List nalCallNumbers |
| | List nlcCallNumbers |
| | List nlmCallNumbers |
| | List govDocCallNumbers |
| | List isbns |
| | List issns |
| | String primaryIsbn |
| | List lccns |
| | List urls |
| | List notes |
| | String oclcNumber |
| | boolean held |
| | int totalHoldings |
| Vendor-specific Information | String vendorCustomerId |
| | String vendorControlNumber |
| | String vendorPrice |
| | String vendorLogoFileName |
| | String vendorName |
| | String vendorCode |
| | String vendorNote |
| | String customVendorFields |
| Institution/user-related Information | String selector |
| | Fund fund |
| | Location location |
| Application-specific Information | Long id |
| | boolean fresh |
| | ItemStatus status |
| | String price |
| | int quantity |
| | String deferReason |
| | String forwardedFrom |
| | List userNotes |
| | SelectionListItem listItem |
| | String fullRecordXML |

View Controllers: Shale provides an interface called org.apache.shale.view.ViewController with implementations that 1) act as a backing bean for a view; 2) include methods that correspond to the actions available in the view; and 3) can provide methods that are invoked by the JSF controller during the request-processing lifecycle for the view. Each ViewController typically contains properties (objects) that are backing beans for UI components plus getter and setter methods for each. These properties provide handles to the underlying objects should they need to be accessed by business logic. ViewControllers also typically contain methods that can be bound to the action attributes of UI "command" components so that, for example, selecting on a button in the view invokes the bound method.

Subclasses of ViewController can override methods from the ViewController interface such as init( ) postback( ) prerender( ) and destroy( ) in order to affect the application's behavior at certain plug-points in the request-processing lifecycle. View controllers typically live in the Java package org.oclc.slx.view.controller. Each ViewController typically corresponds to a single view-id, which is the name of a rendered page. (The actual page does not have to exist as it can be a tiles definition, or something else along those lines.) A base class (AbstractViewController) implements ViewController and provides common convenience methods for subclasses. A subclass of AbstractViewController is created for each view in Selection.

Each folder list view uses a different instance of the same subclass of AbstractViewController (FolderViewController). Each instance of FolderViewController (bean) is created in request scope, as they last as long as their view lasts, which is one request. Each ViewController has a method for every action available on its view. Per JSF, these methods take 0 parameters and return a string known as an "outcome." Each combination of a view-id and an outcome has a mapping in a JSF configuration file that determines what view-id is rendered as the response. A null outcome keeps the user on the current page. Each ViewController has getter and setter methods (and usually a backing object property) for every input component in the view. JSF automatically populates the backing objects in the ViewController with the values of the view's input components whenever the view's form is submitted. Each view contains a single form to ensure that all values are submitted every time an action is taken. This approach allows automatic save values the user has entered whenever the user leaves a page.

The ViewController populates the backing objects for the UI components in its view. For example, all messages that appear in a view are generated inside an action of prerender( )method of the ViewController because such methods are guaranteed to be run at most one time during the lifecycle, which prevents duplication. If a model object needs to be modified for the view, it happen inside the corresponding ViewController. When necessary, the ViewController wraps a model object with a bean object that provides any view-specific functionality before the view is rendered and unwraps the model object before the model is updated and business logic is invoked.

FolderView Controller: The ViewController for the folder list views is named FolderViewController. FolderViewController either asks its SelectionItemController to retrieve the items in the current folder or asks its Visit (the user's visit bean) for them (e.g., when returning to the current folder from a detailed notification item view). The init( )method of the ViewController interface may be used to preload data for a view. The current folder's items are displayed in tabular (list) form. Each selection item (row) in the table can be flagged (e.g., with a check in a checkbox). Each one is wrapped with a SelectionListItemBean. The bean class decorates it with a boolean field indicating whether or not it is flagged. FolderViewController is responsible for wrapping the SelectionListItems in SelectionListItemBeans. FolderViewController's visit property retains the list of wrapped items, so the flagging changes are automatically retained as long as the list is current.

Each piece of data in the list is displayed using Trinidad's outputText component, which has an attribute called "truncateAt" whose value specifies either no truncation (0) or truncation at a specific length (>13). FolderViewController has an int property called truncateData that can be set to 0 or 1. FolderViewController populates the "truncateAt" attribute for each outputText component with an el-expression that multiplies the required number of characters by the truncateData field, e.g. truncateAt="#{(folder.truncateData*20})". This attribute allows the truncateData property to enable or disable truncation for the whole table.

A commandLink component is added to the header facet of each column in the table. Each such commandLink has its action attribute bound to the method FolderViewController- .sortTableData( ) and has a parameter component containing the name of the column. The sortTableData( )method uses the column name parameter to determine what criterion by which to sort the table. The sorting for titles takes into consideration the non-filing characters in the MARC record to ignore articles such as "the" and "a." This method returns a null outcome which returns us to the same view with a re-sorted list.

A list of checkboxes on the folder list views (below the list) allows the user to show/hide individual columns in the table. FolderViewController keeps track of the values of these checkboxes in a FolderViewPreferences object. This object contains a boolean for each column. Client-side Javascript is responsible for actually showing/hiding the columns based on the state of each checkbox component. The view controller is responsible for saving the show/hide values.

A selectOneChoice (pulldown) component containing available actions in the folder list views is bound to FolderViewController.currentAction. When a selection is made from the selectOneChoice component the method FolderViewController.moveRecords( ) is called. This method iterates over the list of SelectionListItemBeans and pulls out the ones that are flagged. It then checks the value of currentAction and calls the appropriate method in the SelectionItemController (i.e., selectRecords( ) deferRecords( ) etc.) on the flagged items. If the action is successful, the current list is cleared out and re-fetched (minus the moved items). A null outcome is returned so that the user returns to the current page.

Business Controllers: Each ViewController contains one or more properties that are instances of classes called BusinessControllers. A BusinessController performs the application's business logic. The ViewController gathers user input and passes it along to a BusinessController. The BusinessController performs its logic and returns model classes to the ViewController. The ViewController wraps or modifies the model classes as needed. "BusinessController" is a term that is used to differentiate the objects that control business logic from the objects that control the presentation and processing of views.

BusinessController classes contain methods to perform specific business functions. These methods use interfaces rather than concrete classes wherever possible to accomplish their tasks. For example, when the SelectionItemController needs to access a data source to store or retrieve notification items, it uses the SelectionItemDAO interface rather than using either a concrete implementation of SelectionItemDAO or having its own concrete DAO logic. This approach keeps SelectionItemController independent of the database/ORM implementation details.

SelectionItemController: SelectionItemController contains methods that FolderViewController uses to populate the folder list views with selection items such as getItemsForStatus( ) and selectRecords( ) SelectionItemController uses the SelectionItemDAO interface to store/retrieve selection (notification) items to/from the selection item data source (database). No more than 1000 items are displayed in any folder list view, but a folder may contain more than 1000 items. Therefore, the getItemsForStatus( )method returns an object that contains a list of up to 1000 notification records and an integer containing the count of how many notification records were actually in the folder in the data source. As a result, it is possible to display the full count while only retrieving and displaying 1000 items.

Folder list view actions allow movement of items to other folders, such as selectRecords. Each action has a corresponding method that sets the folder name in each item (selectRecords( ) sets the folder name to SELECTED) and then uses the SelectItemDAO to save the affected items. Two methods have specialized behavior beyond this. The deferRecords( )method also sets the deferred reason in each item from a value passed in by the ViewController. The forwardTo( )method sets the selector in each item from a value passed in by the ViewController and sets the forwardedFrom field on each item to be the current user's id.

Data Access Objects (DAOs): BusinessControllers depends on several different interfaces. Most of these interfaces are Data Access Object (DAO) interfaces that are specific to one type of data. A DAO stores and retrieves data to/from a data source and converts model objects to/from data appropriate for the data source in the process. Sometimes a model object is made up of data from several different data sources. In such cases, the BusinessController is responsible for assembling/disassembling unified model objects from/to DAO objects. Most data sources are purely conceptual representations of data in a relational database.

The SelectionItemDAO interface is implemented by the concrete class HibernateSelectionItemDAO. The HibernateSelectionItemDAO class extends the Spring framework's abstract class HibernateDaoSupport. The HibernateDaoSupport class provides the JDBC session and configuration support required to perform CRUD operations on the database. The Hibernate database and session configuration is defined in the dataSource, sessionFactory, and hibernateItemDAO beans located in the \WEB-INF\applicationContext.xml file. Spring dependency injection instantiates these beans and injects them into the BusinessController beans that depend on them. Each table in the database has a corresponding plain old Java object (pojo) with an empty constructor and getters and setters for its attributes. Each property of these pojos relates to a column in a database table. Each pojo has a corresponding pojo.hbm.xml configuration file that is used by Hibernate to map data retrieved from a query to the pojo (and vice versa for updates). Hibernate uses these mappings to dynamically create and cache native SQL statements. Each pojo.hbm.xml is exposed to the application via the mapping Locations property defined in the sessionFactory bean in the applicationContext.xml configuration file.

The application uses the HibernateSelectionItemDAO method getItemsForStatus( ) to retrieve the selection items for each folder list view. The folder name represents the item's status, (i.e., Inbox, Forwarded, Deferred, Rejected, Exported). The DAO passes the items retrieved to an instance of the BuildSelectionListItems class, which builds and returns a list of SelectionListItems (model objects that a BusinessController or ViewController understands). The BuildSelectionListItems object resolves the object/relational missmatches between the domain (aka model) and database objects. To save a list of items that have been flagged in a view, controllers invoke the saveItems( )method of HibernateSelectionItemDAO, which build the database objects from the domain objects and persist the user changes to the database.

The present invention provides centralized, automated, integrated materials selection and acquisition for libraries. With the present invention, libraries receive corresponding bibliographic database records for newly purchased materials so that new materials are readily added to each library's integrated library system. The library's holding symbol is automatically set on the corresponding bibliographic database record for the item so that addition of the item to library's holding is noted quickly and easily.

While certain exemplary embodiments are described in detail above, the scope of the application is not to be considered limited by such disclosure, and modifications are possible without departing from the spirit of the invention as evidenced by the following claims:

The invention claimed is:

1. A computerized method for assisting libraries and vendors with selection and acquisition of library collection items, comprising:
   (a) receiving at a library service computer from a plurality of libraries electronic library profile data comprising:
      (1) an identifier for at least one electronic mailbox for receiving vendor notification records, wherein each vendor notification record comprises bibliographic data for a bibliographic item offered for sale by a vendor; and
      (2) selection criteria associated with said electronic mailbox for routing said vendor notification records to said electronic mailbox;
   (b) storing said library profile data in a library profile database at said library service computer;
   (c) providing a plurality of vendors of bibliographic items with access to said library profile data;
   (d) receiving at said library service computer electronic notification items from said plurality of vendors, each of said notification items comprising:
      (1) identifying information for a vendor; and
      (2) bibliographic data for a bibliographic item offered for sale by said vendor to said plurality of libraries;
   (e) in response to said receiving at said library service computer electronic notification items from said plurality of vendors, automatically performing the following steps using a computer processor:
      (1) adding at said library service computer to a notification record for each of said notification items said identifying information for said vendor and said bibliographic data;
      (2) comparing at said library service computer said selection criteria for said electronic mailbox with said bibliographic data in each of said notification records;
      (3) in response to said bibliographic data matching said selection criteria, routing said notification records to said at least one electronic mailbox for each of said plurality of libraries;
   (f) providing at least one computer user for each of said plurality of libraries with a software application at said library service computer for:
      (1) reviewing said notification records in said electronic mailbox; and
      (2) selecting said notification records in said electronic mailbox for acquisition of a bibliographic item in said notification record;
   (g) receiving at said library service computer through said electronic mailboxes indicators for selected notification records;
   (h) exporting at said library service computer to an electronic mailbox for an acquisition staff member for each of said plurality of libraries said selected notification records for addition of items in said notification records to each of said plurality of libraries' holdings; and
   (i) adding records for items identified in said selected notification records to an integrated library system computer for each of said plurality of libraries.

2. The method of claim 1 wherein said bibliographic data for said notification items comprises an item selected from the group consisting of author, publisher, date of publication, and call number.

3. The method of claim 1 wherein said notification records comprise fund information.

4. The method of claim 1 further comprising the step of setting a holding symbol for each of said plurality of libraries on a corresponding computer library service bibliographic database record to note addition of items identified in said selected notification records to each of said plurality of libraries' holdings.

5. The method of claim 1 wherein providing said at least one computer user for each of said plurality of libraries with a software application for reviewing and selecting said notification records comprises providing said computer user with a software application to:
   (a) view notification records;
   (b) modify notification records;
   (c) select notification records;
   (d) reject notification records;
   (e) defer notification records; and
   (f) forward notification records.

6. The method of claim 1 further comprising completing an electronic order for items identified in said selected notification records from said integrated library system for each of said plurality of libraries.

7. The method of claim 1 further comprising creating and presenting a summary of selected notification records for each said plurality of libraries for access by a respective representative of each of said plurality of libraries.

8. A computerized system for assisting libraries and vendors with selection and acquisition of library collection items comprising:
   (a) a computer server comprising:
      (1) a bibliographic database at said computer server comprising bibliographic data for a plurality of libraries;
      (2) a library profile database at said computer server accessible to computer systems of vendors of library collection items comprising for each of said plurality of libraries:
         (i) contact and collection information for said library;
         (ii) an identifier for at least one electronic mailbox for receiving notification records; and
         (iii) selection criteria associated with said electronic mailbox that correspond with bibliographic data elements in notification records routed to said electronic mailbox;
   (b) a first memory at said computer server configured to cause said computer server to perform the steps of:
      (1) receiving electronic notification items from computer systems of said vendors, each of said electronic notification items comprising:
         (i) bibliographic data elements for a bibliographic item offered for sale by said vendor; and
         (ii) identifying information for said bibliographic item;
      (2) in response to said receiving electronic notification items from computer systems of said vendors, automatically performing the following steps:
         (i) adding to a notification record for each of said notification items identifying information for said vendor and said bibliographic data;
         (ii) comparing said bibliographic data in each of said notification records with said selection criteria for said electronic mailbox;
         (iii) in response to said bibliographic data matching said selection criteria, routing said notification records to said at least one electronic mailbox for each of said plurality of libraries;
   (c) a second memory at said computer server configured to cause said computer server to perform the steps of:

(1) receiving said routed notification records;
(2) providing an interface for selection of said routed notification records;
(3) exporting said selected notification records to an electronic mailbox;
(4) adding bibliographic items identified in said selected notification records to an integrated library system computer.

9. The system of claim 8 wherein said bibliographic data for notification items comprises author, publisher, date of publication, and call number.

10. The system of claim 8 wherein said notification records comprise fund information.

11. The system of claim 8 wherein said computer server further updates said computer library service bibliographic database for each of said plurality of libraries to set a holding symbol to note addition of items identified in said selected notification records to each of said plurality of libraries' holdings.

12. The system of claim 8 wherein said second memory at said computer server is configured to cause said computer server to allow a computer user to:
    (a) view notification records;
    (b) modify notification records;
    (c) select notification records;
    (d) reject notification records;
    (e) defer notification records; and9
    (f) forward notification records.

13. The system of claim 8 wherein said second memory at said computer server is configured to cause said computer server to initiate an electronic, order for items identified in said selected notification records from said integrated library system for each of said plurality of libraries.

14. The system of claim 8 further wherein said second memory at said computer server is configured to cause said computer server to provide a summary of selected notification records for each said plurality of libraries for access by a respective representative of each of said plurality of libraries.

15. A computerized system for managing notification items for use by computer users at each of a plurality of libraries to review and select notification records comprising:
    (a) a library service computer server comprising:
        (1) a bibliographic database for use by a plurality of libraries;
        (2) a library profile database at said library service computer accessible to computer systems of vendors of library collection items comprising for each of said plurality of libraries:
            (i) contact and collection information for said library;
            (ii) an identifier for at least one electronic mailbox for receiving notification records; and
            (iii) selection criteria associated with said electronic mailbox that correspond with bibliographic data elements in notification records routed to said electronic mailbox;
    (b) a first memory at said library service computer server configured to cause said computer server to perform the steps of:
        (1) receiving electronic notification items from computer systems of said vendors, each of said electronic notification items comprising:
            (i) bibliographic data elements for a bibliographic item offered for sale by said vendor; and
            (ii) identifying information for said bibliographic item;
        (2) in response to said receiving electronic notification items from computer systems of said vendors, automatically performing the following steps:
            (i) adding to a notification records for each of said notification items vendor identifying information and bibliographic data;
            (ii) comparing said bibliographic data in each of said notification records with said selection criteria for said electronic mailbox;
            (iii) in response to said bibliographic data matching said selection criteria, routing said notification records to said electronic mailbox;
    (c) a second memory at said computer server configured to cause said computer server to perform the steps of:
        (1) providing a computer user from one of said plurality of libraries with an interface configured to access said notification records routed to said electronic mailbox;
        (2) providing said computer user with an interface configured to organize said notification records in said electronic mailbox according to:
            (i) notification records for items offered by vendors;
            (ii) selected notification records for items to be purchased; and
            (iii) rejected notification records for items rejected by said computer user.

16. The system of claim 15 wherein said second memory at said computer server is configured to cause said computer server to perform steps of organizing said notification records in said electronic mailbox according to:
    (1) notification records forwarded to said at least one computer user from another computer user;
    (2) notification records forwarded to another computer user by said at least one computer user; and
    (3) notification records deferred by said at least one computer user.

17. The system of claim 15 wherein said first memory at said computer server is configured to cause said computer server to route said notification records by assigning notification records to computer users according to call number ranges and keywords for said bibliographic data in said notification records.

18. The system of claim 15 wherein said second memory at said computer server is configured to cause said computer server to allow an administrator to define a plurality of collection areas for an institution and identify computer users responsible for notification records in one of said collection areas.

19. The system of claim 15 wherein said second memory at said computer server is configured to cause said computer server to export said selected notification records for loading into an integrated library system.

* * * * *

UNITED STATES PATENT AND TRADEMARK OFFICE
CERTIFICATE OF CORRECTION

PATENT NO. : 7,827,070 B1
APPLICATION NO. : 11/777352
DATED : November 2, 2010
INVENTOR(S) : Joel Abrams et al.

It is certified that error appears in the above-identified patent and that said Letters Patent is hereby corrected as shown below:

In Other Publications, page 2, Column 2, line 2 - please delete "lasted" and insert -- last --

In Column 9, please delete section entitled "Refreshing Record Lists" in Table 5 and insert the following:

| Refreshing Record Lists | The list of notification records is refreshed when a selector: <br>• Takes an action (Select, Reject, Defer, Forward) on one or more notification records from the list. <br>• Takes an action (Select, Reject, Defer, Forward) on a single notification record while viewing the full record. <br>• Customizes the list (e.g., re-sort the items, turns data truncation on or off, adds or removes columns). <br>• Switches to another folder or returns to the current folder from viewing records if the selector selects the folder name on the navigation bar (or uses an assigned keystroke). <br><br>One entry is updated, but the list is not refreshed when the selector edits a notification record, saves the record, and then selects Back to List (or presses an assigned keystroke) to return to the list. <br><br>The list is not refreshed when the selector: <br>• Views a notification record and selects Back to List (or presses an assigned keystroke) to return to the list. <br>• Views several notification records without returning to the list. <br>• Edits an open notification record, cancel changes, and then selects Back to List (or presses an assigned keystroke) to return to the list. <br><br>Results of refreshing the list: <br>• Flags (check marks) are cleared. <br>• Changes to list display (columns, sorting, etc.) take effect. <br>• Notification records move from or appear in the current folder as the result of actions. |
|---|---|

In Column 11, line 33, please delete "bibliographic'," and insert -- bibliographic, --

In Column 20, line 31, please delete "happen" and insert -- happens --

In Column 21, line 25, please delete "Controller (i.e., selectRecords() deferRecords() etc.) on the" and insert -- Controller (i.e, selectRecords(), deferRecords(), etc.) on the --

Signed and Sealed this
Twenty-fifth Day of January, 2011

David J. Kappos
*Director of the United States Patent and Trademark Office*

CERTIFICATE OF CORRECTION (continued)
U.S. Pat. No. 7,827,070 B1

In Column 21, line 53, delete "tus() and selectRecords() SelectionItemController uses the" and insert -- tus() and selectRecords(). SelectItemController uses the --

In Column 25, line 27, delete "(e) defer notification records; and9" and insert -- (e) defer notification records; and --

In Column 25, line 32, delete "electronic," and insert -- electronic --

In Column 26, line 11, delete "records" and insert -- record --